United States Patent
Chen et al.

(10) Patent No.: US 9,626,992 B2
(45) Date of Patent: Apr. 18, 2017

(54) READ ASSEMBLY, DATA STORAGE SYSTEM, AND METHODS OF USING THE SAME

(71) Applicant: MARVELL INTERNATIONAL LTD., Hamilton (BM)

(72) Inventors: Yunjie Chen, Singapore (SG); Siang Huei Leong, Singapore (SG); Bo Liu, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/900,023

(22) PCT Filed: Jun. 25, 2014

(86) PCT No.: PCT/SG2014/000300
§ 371 (c)(1),
(2) Date: Dec. 18, 2015

(87) PCT Pub. No.: WO2014/209231
PCT Pub. Date: Dec. 31, 2014

(65) Prior Publication Data
US 2016/0140989 A1    May 19, 2016

(30) Foreign Application Priority Data
Jun. 26, 2013 (SG) .............. 201304958-0

(51) Int. Cl.
*G11B 5/596* (2006.01)
*G11B 5/48* (2006.01)
*G11B 5/02* (2006.01)
*G11B 5/115* (2006.01)
*G11B 5/82* (2006.01)
*G11B 5/39* (2006.01)

(52) U.S. Cl.
CPC .............. *G11B 5/4886* (2013.01); *G11B 5/02* (2013.01); *G11B 5/115* (2013.01); *G11B 5/3974* (2013.01); *G11B 5/59633* (2013.01); *G11B 5/82* (2013.01); *G11B 5/3912* (2013.01)

(58) Field of Classification Search
CPC ....... G11B 5/58; G11B 5/584; G11B 5/59655; G11B 5/59688; G11B 5/59627; G11B 5/6005
USPC ....... 360/77.01, 77.02, 77.05, 77.08, 48, 75; 369/13.13, 13.33
See application file for complete search history.

(56) References Cited

U.S. PATENT DOCUMENTS 4,012,781 A * 3/1977 Lin ................ G11B 5/3954
                                                324/252
4,402,025 A   8/1983 Anderson et al.
(Continued)

OTHER PUBLICATIONS

International Search Report regarding Application No. PCT/SG2014/000300, mailed Sep. 24, 2014; ISA/AU.
(Continued)

*Primary Examiner* — Nabil Hindi

(57) ABSTRACT

In various embodiments, a read assembly for reading a dual-layered medium may be provided. The dual-layered medium may include a servo layer and a data layer over the servo layer. The read assembly may include a data read head configured to read the data layer. The read assembly may also include a servo read head configured to read the servo layer.

23 Claims, 10 Drawing Sheets

(56) References Cited

U.S. PATENT DOCUMENTS

| | | | |
|---|---|---|---|
| 4,918,972 A | | 4/1990 | Kenny et al. |
| 5,187,620 A | * | 2/1993 | Notake .............. G11B 5/59627 360/77.04 |
| 5,262,907 A | * | 11/1993 | Duffy .................... G11B 5/556 360/135 |
| 5,568,331 A | | 10/1996 | Akagi et al. |
| 6,934,108 B2 | | 8/2005 | Harper et al. |
| 7,729,092 B1 | | 6/2010 | Mallary et al. |
| 9,001,455 B2 | * | 4/2015 | Nakashio ................. G11B 5/78 360/134 |
| 2005/0073762 A1 | * | 4/2005 | Sato ................... G11B 5/59633 360/51 |
| 2013/0155826 A1 | | 6/2013 | Zhang et al. |

OTHER PUBLICATIONS

Written Opinion regarding Application No. PCT/SG2014/000300, mailed Sep. 24, 2014.

\* cited by examiner

FIG. 8

800 provide a read assembly over the dual-layered medium, the read assembly including a data read head and a servo read head

802 read the data layer using the data read head and reading the servo layer using the servo read head

804

READ ASSEMBLY, DATA STORAGE SYSTEM, AND METHODS OF USING THE SAME

CROSS-REFERENCE TO RELATED APPLICATIONS

This application is a U.S. National Phase application under 35 U.S.C. 371 of International Application No. PCT/SG2014/000300 filed 25 Jun. 2014 and published in English as WO 2014/209231 A1 on 31 Dec. 2014, which claims the benefit of and priority to Singapore Application No. 201304958-0 filed Jun. 26, 2013, the contents of both of the above applications are hereby incorporated by reference in their entirety for all purposes.

TECHNICAL FIELD

Various aspects of this disclosure relate to read assemblies, data storage systems and methods of using the same.

BACKGROUND

Perpendicular magnetic recording (PMR) technology has replaced longitudinal magnetic recording (LMR) around 2005-2007 and pushed today's recording density to ~700-800 Gbpsi. Heat-assisted magnetic recording (HAMR) has now been considered as the most promising technology for next generation magnetic recording for >1.2 Tbpsi.

In order to achieve higher recording densities, various technologies relating to the magnetic storage media as well as associated apparatuses such as read/write heads need to be further developed.

SUMMARY

In various embodiments, a read assembly for reading a dual-layered medium may be provided. The dual-layered medium may include a servo layer and a data layer over the servo layer. The read assembly may include a data read head configured to read the data layer. The read assembly may also include a servo read head configured to read the servo layer.

In various embodiments, a method of using a read assembly to read a dual-layered medium may be provided. The dual-layered medium may include a servo layer and a data layer over the servo layer. The method may include providing a read assembly over the dual-layered medium. The read assembly may include a data read head and a servo read head. The method may further include reading the data layer using the data read head and reading the servo layer using the servo read head.

BRIEF DESCRIPTION OF THE DRAWINGS

The invention will be better understood with reference to the detailed description when considered in conjunction with the non-limiting examples and the accompanying drawings, in which:

FIG. 8 shows a schematic illustrating a method using a read assembly to read a dual-layered medium.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

It should be understood that the terms "top", "side", "upper", "lower" etc., when used in the following description are used for convenience and to aid understanding of relative positions or directions, and not intended to limit the orientation of a dual-layered medium, a read assembly or a data storage system.

It may also be understood that a first element over a second element may include the first element on the second element or that the first element is separated from the second element by one or more intermediate elements such as an intermediate layer, air or vacuum.

A dual layer dedicated servo medium (also referred to as dual-layered medium) has been proposed to save the data layer storage area and to increase the servo tracking capability for higher track density. The dual layer dedicated servo medium may be seen as an extendibility technology for conventional PMR.

Figure 1:
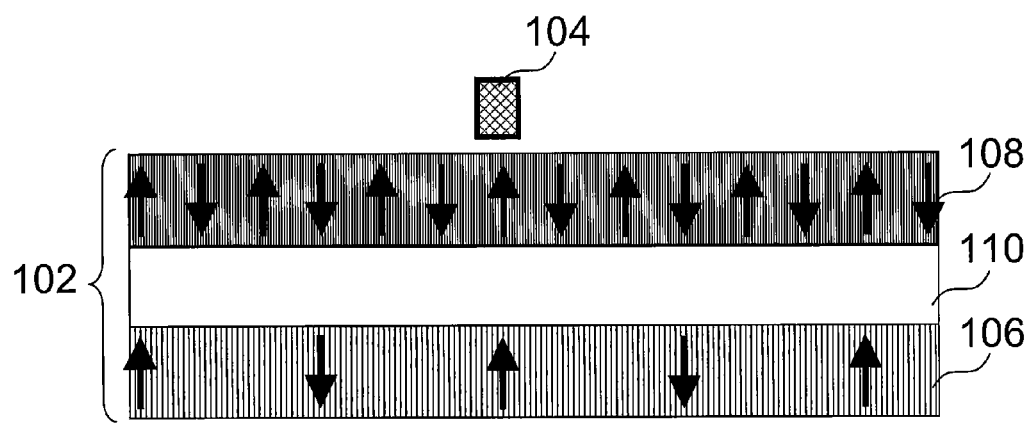
FIG. 1 shows a cross-sectional side view of a dual-layered medium with a read head 104.

FIG. 1 shows a cross-sectional side view 100 of a dual-layered medium 102 with a read head 104. The dual-layered medium 102 may include a servo layer 106 and a data layer 108 over the servo layer 106. In addition, the dual-layered medium 102 may include a spacer layer 110 between the servo layer 106 and the data layer 108. As seen from FIG. 1, both the servo layer 106 and the data layer 108 may be recorded using perpendicular magnetic recording. Perpendicular recording in the servo layer 106 may require a high nucleation field.

Figure 2:
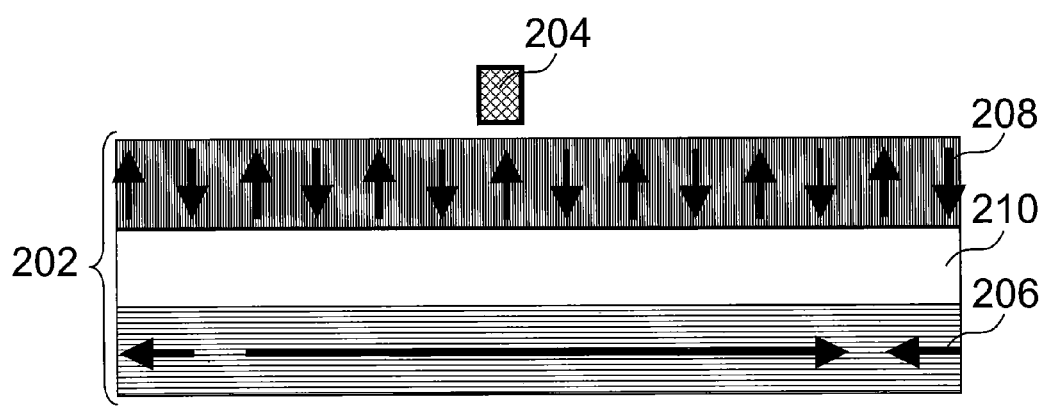
FIG. 2 shows a cross-sectional side view of another dual-layered medium with a read head.

FIG. 2 shows a cross-sectional side view 200 of another dual-layered medium 202 with a read head 204. The dual-layered medium 202 may include a servo layer 206 and a data layer 208 over the servo layer 206. In addition, the dual-layered medium 202 may include a spacer layer 210 between the servo layer 206 and the data layer 208. The servo layer 206 may be recorded using longitudinal magnetic recording (LMR) while the data layer 208 may be recorded using perpendicular magnetic recording. Since the magnetic easy axis for LMR is in-plane, the hard axis of the servo layer 206 is in the perpendicular direction.

Figure 3:
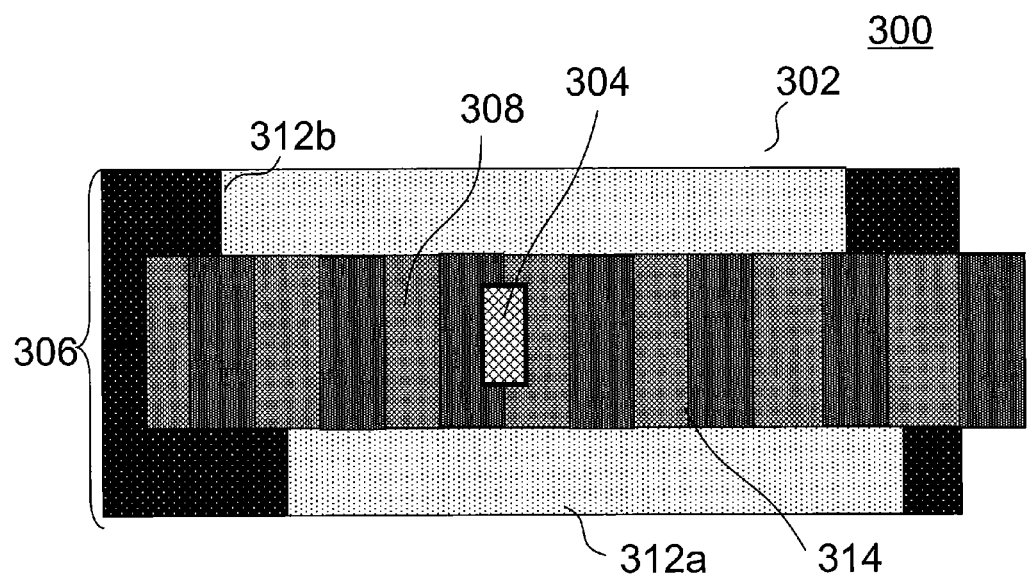
FIG. 3 shows a top planar view of a dual-layered medium with a read head.

FIG. 3 shows a top planar view 300 of a dual-layered medium 302 with a read head 304. FIG. 3 may correspond to the top view of either the medium shown in FIG. 1 or the medium shown in FIG. 2. The dual-layered medium 302 may include a servo layer 306 and a data layer 308 over the servo layer 306. The servo layer 306 may include a plurality of servo tracks such as servo track n (denoted by 312a) and servo track (n+1) (denoted by 312b). The servo layer 306 may include additional servo tracks which are not shown in FIG. 3. Similarly, the data layer 308 may include a plurality of tracks, such as data track 314. The data layer 308 may include additional data tracks which are not shown in FIG. 3. The plurality of (servo and data) tracks 312a, 312b, 314 may run substantially parallel to the inner circumference and the outer circumference of the magnetic medium 302. The magnetic medium 302 may be a ring-shaped disk having an inner circumference and an outer circumference substantially parallel to the inner circumference. The inner circumference may define an inner circumferential wall extending at least over a thickness of the servo layer 306 and a thickness of the data layer 308. The outer circumference may define an outer circumferential wall extending at least over the thickness of the servo layer 306 and the thickness of the data layer 308.

Since servo patterns or part of servo patterns may be recorded in the dedicated servo layer 306, an area of up to 7% in data layer 308 may be saved for data storage, thus increasing (data) recording density. Furthermore, the servo patterns recorded in the dedicated servo layer 306 may allow for a continuous positioning error signal (PES) and may thus enhance track following capability, leading to higher track densities.

One challenge for signal detection is that the same data read head 304 is used for both the high density data signal from data layer 308 and the low density servo signal from servo layer 306. The sensitivity of the servo signal detection may be sacrificed due to the larger distance between the read head 304 and the servo layer 306 than the distance between the read head 304 and the data layer 308. It is difficult to separate the less sensitive servo signal from the total readback signal (including both servo signal and data signal) for good PES feedback.

Figure 4:
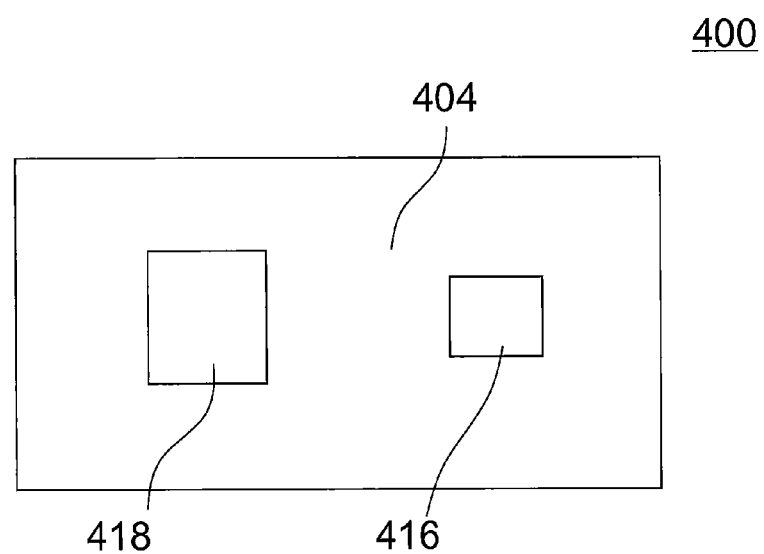
FIG. 4 is a schematic of a read assembly for reading a dual-layered medium according to various embodiments.

FIG. 4 is a schematic 400 of a read assembly 404 for reading a dual-layered medium (not shown in FIG. 4) according to various embodiments. The dual-layered (magnetic) medium may include a servo layer and a data layer over the servo layer. The read assembly may include a data read head 416 configured to read the data layer. The read assembly may also include a servo read head 418 configured to read the servo layer.

In other words, separate read heads 416, 418 may be used to read from the data layer and the servo layer.

Various embodiments may provide a dedicated servo read head 418 to separately detect low linear density servo signal from the lower servo layer in dual layer dedicated servo media and to improve the servo signal detection sensitivity. Various embodiments may also provide data read head 416 for reading data signal for the upper data layer.

A dedicated servo read head 418 may be used to detect low linear density servo signal from the lower servo layer in a dual layer dedicated servo (DS) medium while the high linear density data signal from the upper data layer may be read back by a conventional data read head 416. This may allow separate detection of data and servo signals and thus may improve the servo signal detection sensitivity individually. Various embodiments allow for better servo and data signal detection. The requirements for dedicated servo media specifications such as k (data signal amplitude to servo signal amplitude ratio) may also be relaxed. The dedicated servo read head 418 may be different from normal data read head and may have a different head structure with larger MR-sensor-to-shield gap g (g>>B; B: data bit length) for low linear density servo signal. Optimized head gap ($g=2n\pi/k_0$; $k_0$: wave number) and proper design/control of head-media-spacing (HMS) for servo read head 418 may help further reduce interference from data signal to servo signal detection due to gap loss.

In various embodiments, the data read head 416 may include a first shield structure. The data read head 416 may also include a second shield structure. The data read head may additionally include a sensor between the first shield structure and the second shield structure. The first shield structure and the second shield structure may be separate or may be different portions of a shield assembly or a shield component. For instance, the first shield structure and the second shield structure may be two arms of an U-shaped shield assembly or a shield component. The sensor may be a first magnetoresistance sensor. The sensor may instead be a giant magnetoresistance (GMR) sensor or a tunneling magnetoresistance (TMR) sensor or any other suitable sensor for reading a magnetic medium.

The servo read head 418 may include a third shield structure. The servo read head 418 may further include a fourth shield structure. The servo read head may include another sensor between the third shield structure and the fourth shield structure. The third shield structure and the fourth shield structure may be separate or may be different portions of a shield assembly or a shield component. For instance, the third shield structure and the fourth shield structure may be two arms of an U-shaped shield assembly or a shield component. The other sensor may be a second magnetoresistance sensor. The other sensor may instead be a giant magnetoresistance (GMR) sensor or a tunneling magentoresistance (TMR) sensor or any other suitable sensor for reading a magnetic medium.

In various embodiments, a shield assembly or a shield component may include one or more of the first, second, third and fourth shield structures.

A first distance defined between the first shield structure and the second shield structure may be smaller than a second distance defined between the third shield structure and the fourth shield structure. In various embodiments, the servo read head 418 may be configured to read the servo layer by having a greater sensor-shield structure distance on both sides of the servo read sensor, i.e. the other sensor. In contrast, the data read head 416 may be configured to read the data layer by having a smaller sensor-shield structure distance on both sides of the data read sensor, i.e. the sensor.

The read assembly 404 may further include an isolation layer between the data read head 416 and the servo read head 418.

The data read head 416 and the servo read head 418 may be positioned over the dual-layered medium with the data layer closer to both the data read head 416 and the servo read head than the servo layer 418. In other words, the data read head 416 and the servo read head 418 may be positioned facing data layer side of the dual-layered medium.

The read assembly 404 may further include a further servo read head configured to read the servo layer.

The further servo read head may include a fifth shield structure. The further servo read head may further include a sixth shield structure. The further servo read head may include a further sensor between the fifth shield structure and the sixth shield structure. The fifth shield structure and the sixth shield structure may be separate or may be different portions of a shield assembly or a shield component. For instance, the fifth shield structure and the sixth shield structure may be two arms of an U-shaped shield assembly or a shield component. The further sensor may be a second magnetoresistance sensor. The further sensor may instead be a giant magnetoresistance (GMR) sensor or a tunneling magentoresistance (TMR) sensor or any other suitable sensor for reading a magnetic medium.

In various embodiments, a shield assembly or a shield component may include one or more of the first, second, third, fourth, fifth and sixth shield structures.

In various embodiments, the data read head 416 may be positioned between the servo read head 418 and the further servo read head. In various alternate embodiments, the servo read head 418 may be positioned between the data read head 418 and the further servo read head.

The read assembly 404 may also include one or more further data read heads.

In various embodiments, a data storage system may be provided. The data storage system may include a dual-layered medium. The data storage system may also include a read assembly 404 as described herein. The read assembly 404 may be configured to read the dual-layered medium in a read direction.

In various embodiments, the servo read head 418 may be arranged in front of the data read head 416 in the read direction. In various alternate embodiments, the servo read head 418 may be arranged behind the data read head 416 in the read direction.

The dual-layered medium may be a ring-shaped disk having an inner circumference and an outer circumference substantially parallel to the inner circumference. The inner circumference may define an inner circumferential wall extending at least over a thickness of the servo layer and a thickness of the data layer. The outer circumference may define an outer circumferential wall extending at least over the thickness of the servo layer and the thickness of the data layer.

The dual-layered medium may include a plurality of tracks substantially parallel to the inner circumference and the outer circumference. The plurality of tracks may include a plurality of data tracks on the data layer. The plurality of tracks may also include a plurality of servo tracks on the servo layer.

Each track of the plurality of tracks may have a predetermined track width. A data track may be arranged from a neighbouring servo track by half a track width.

In various embodiments, the predetermined track width of each track may be substantially the same.

In various alternate embodiments, each data track may have a first predetermined track width. Each servo track may have a second predetermined track width. The first predetermined track width may be different from the second predetermined track width.

The data read head 416 and the servo read head 418 may be arranged so that a projection of the data read head 416 on the medium and a projection of the servo read head 418 on the medium are laterally along one track of the plurality of tracks at any time.

The data read head 416 may instead be configured to be positioned over the data track and the servo read head 418 may configured to be positioned over the neighbouring servo track.

In various embodiments, a width of the servo read head 418 is different from a width of the data read head 416. In various embodiments, a width of the further servo read head may be different from the width of the data read head 416. A width of the sensor may be the same as or may be different from a width of the other sensor. The width of the sensor may be the same or may be different from a width of the further sensor.

In various embodiments, a spacing between the servo read head 418 and the dual-layered medium (including the servo layer and the data layer) is different from a spacing between the data read head 416 and the dual-layered medium.

Figure 5A:
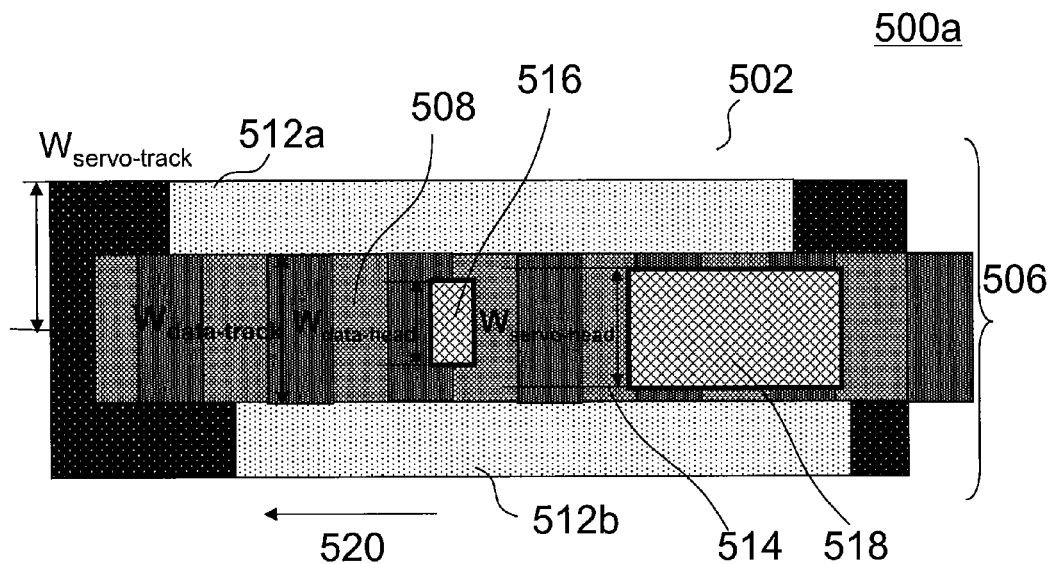
FIG. 5A is a top planar view of a data storage system according to various embodiments.

FIG. 5A is a top planar view 500a of a data storage system according to various embodiments. The data storage system may include a dual-layered medium 502 and a read assembly. The medium 502 may include a servo layer 506 and a data layer 508 over the servo layer 506. The servo layer 506 may include a plurality of servo tracks such as servo track n (denoted by 512a) and servo track (n+1) (denoted by 512b). The servo layer 506 may include additional servo tracks which are not shown in FIG. 5A. Similarly, the data layer 508 may include a plurality of data tracks, such as data track 514. The data layer 508 may include additional data tracks which are not shown in FIG. 5A.

The magnetic medium 502 may be a ring-shaped disk having an inner circumference and an outer circumference substantially parallel to the inner circumference. The plurality of (servo and data) tracks e.g. 512a, 512b, 514 may run substantially parallel to the inner circumference and the outer circumference of the magnetic medium 502. The inner circumference may define an inner circumferential wall extending at least over a thickness of the servo layer 506 and a thickness of the data layer 508. The outer circumference may define an outer circumferential wall extending at least over the thickness of the servo layer 506 and the thickness of the data layer 508. The disk may have a first main surface and a second main surface limiting the thickness of the disk. The first main surface and the second main surface may be substantially parallel to each other and may be substantially perpendicular to the inner circumferential wall (or outer circumferential wall).

The plurality of tracks e.g. 512a, 512b, 514 may form a plurality of concentric rings on the recording medium. The plurality of concentric rings have a common centre coinciding with an axis of the disk running from the center of the first main surface of the disk to the second main surface of the disk.

The read assembly may include a data read head 516 configured to read the data layer 508. The read assembly may also include a servo read head 518 configured to read the servo layer 506. The data head 516 may have a width denoted by $W_{data\text{-}head}$ and the servo head 518 may have a width denoted by $W_{servo\text{-}head}$.

The read assembly may be configured to read the dual-layered medium 502 in a read direction. For instance, the read assembly may be configured to read the medium 502 in the direction indicated by arrow 520. The read assembly may be configured to read medium 502 when the medium 502 moves relative to the read assembly in a direction opposite the direction indicated by arrow 520.

As seen from FIG. 5A, the data read head 516 and the servo read head 518 may be arranged or positioned so that a projection of the data read head 516 on the medium 502 and a projection of the servo read head 518 on the medium 502 may be laterally along one track of the plurality of tracks at any time, i.e. the data read head 516 and the servo read head may have the same off-track position but different down-track positions. For instance, both the data read head 516 and the servo read head 518 may be arranged or positioned so that the projections of both the data read head 516 and the servo read head 518 are on data track 514.

In various embodiments, the servo read head 518 may be positioned or arranged behind the data read head 516 in or along the read direction. The servo read head 518 may be used or configured to detect low linear density servo signal from the servo layer 506 while the data read head 516 may be used or configured to detect data signal from the data layer 508. The servo read head 518 may have a larger read gap (or sensor-to-shield gap) and is thus more sensitive to low density servo signals. The read gap (or sensor-to-shield gap) may be proportional to the distance between the shielding structures on both sides of a sensor. In addition to the benefit of higher servo signal sensitivity, the inclusion of a servo read head 518 separate from data read head 516 may allow for a more relaxed medium specification such as data signal amplitude to servo signal amplitude ratio (k value).

Figure 5B:
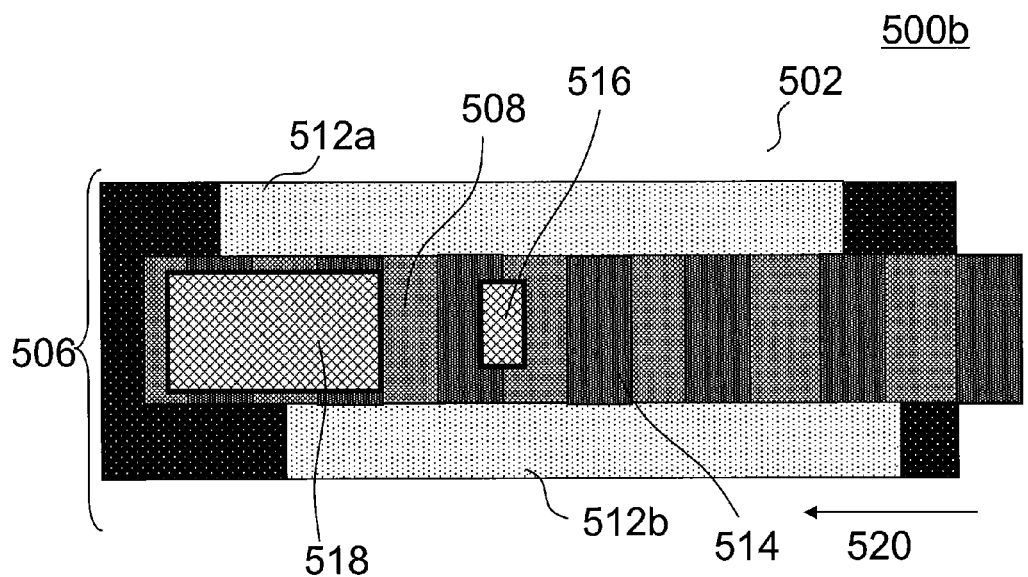
FIG. 5B is a top planar view of another data storage system according to various embodiments.

FIG. 5B is a top planar view 500*b* of another data storage system according to various embodiments. The data storage system shown in FIG. 5B may be similar to the data storage system illustrated in FIG. 5A but with the servo read head 518 arranged or positioned in front of the data read head 516 in or along the read direction.

Figure 5C:
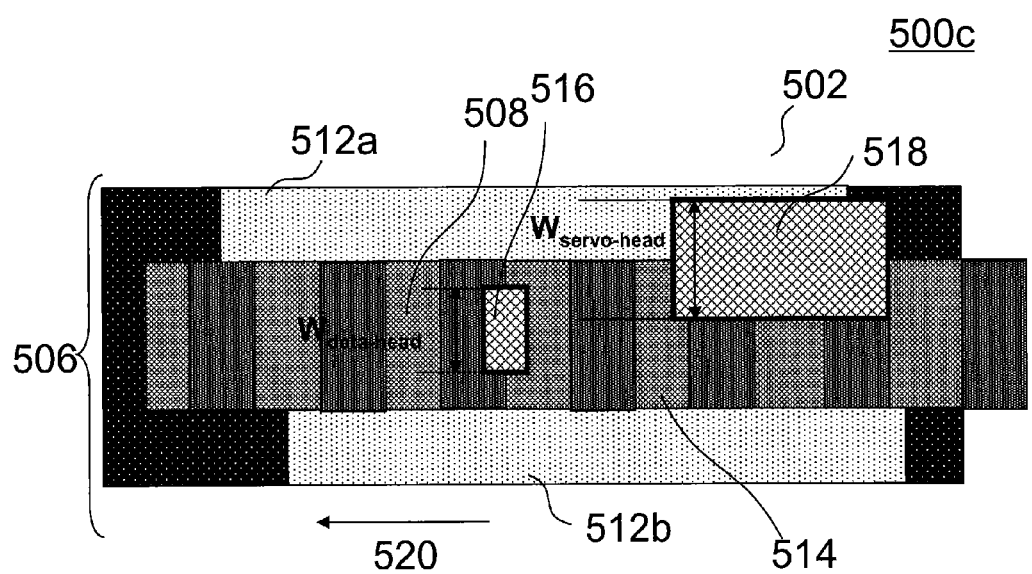
FIG. 5C is a top planar view of yet another data storage system according to various embodiments.

FIG. 5C is a top planar view 500*c* of yet another data storage system according to various embodiments. The data storage system shown in FIG. 5C may be similar to the data storage system illustrated in FIG. 5A but with the servo read head 518 and the data read head 516 no longer aligned over the same track. The servo read head 518 and the data read head 516 may be arranged or positioned over different off-track and different down-track positions. Each track of the plurality of tracks may have a predetermined track width. In various embodiments, each data track (e.g. data track 514) may have the same track width (denoted in FIG. 5A as $W_{data\text{-}track}$). In various embodiments, each servo track (e.g. servo tracks 512*a*, 512*b*) may have the same track width (denoted in FIG. 5A as $W_{servo\text{-}track}$). In various embodiments, the data tracks (e.g. data track 514) and the servo tracks (e.g. servo tracks 512*a*, 512*b*) may have the same track width.

In various alternate embodiments, each data track (e.g. data track 514) may have a first predetermined track width ($W_{data\text{-}track}$). Each servo track (e.g. servo tracks 512*a*, 512*b*) may have a second predetermined track width ($W_{servo\text{-}track}$). The first predetermined track width may be different from the second predetermined track width.

In various embodiments, a data track may be arranged from a neighbouring servo track by half a track width or substantially half a track width. In other words, the data track may be arranged from the servo track (neighbouring to the data track) such that the projection of the data track on a plane parallel to the first main surface of the recording medium (or the second main surface of the recording medium) is half a track width or substantially half a track width from the projection of the servo track on the plane. For instance, servo track 512*a* may be arranged from data track 514 by half a track width and servo track 512*b* may be arranged from data track 514 by half a track width. In various embodiments, a data track may be arranged from a neighbouring servo track by a predetermined offset.

As shown in FIG. 5C, the data read head 516 may be configured to be positioned or arranged over the data track 514 and the servo read head 518 may be configured to be positioned or arranged over the neighbouring servo track, e.g. servo track 512*a*. The data head 516 may have a width denoted by $W_{data\text{-}head}$ and the servo head 518 may have a width denoted by $W_{servo\text{-}head}$. The dedicated servo read head 518 may be positioned or arranged with the predetermined offset to the data read head 516 along the cross-track direction, i.e. in a direction substantially perpendicular to the tracks, so that the servo read head 518 may be aligned to a central line of the servo track, e.g. servo track 512*a*, when the data read head 516 is aligned to a central line of the data track, e.g. data track 514.

Figure 6A:
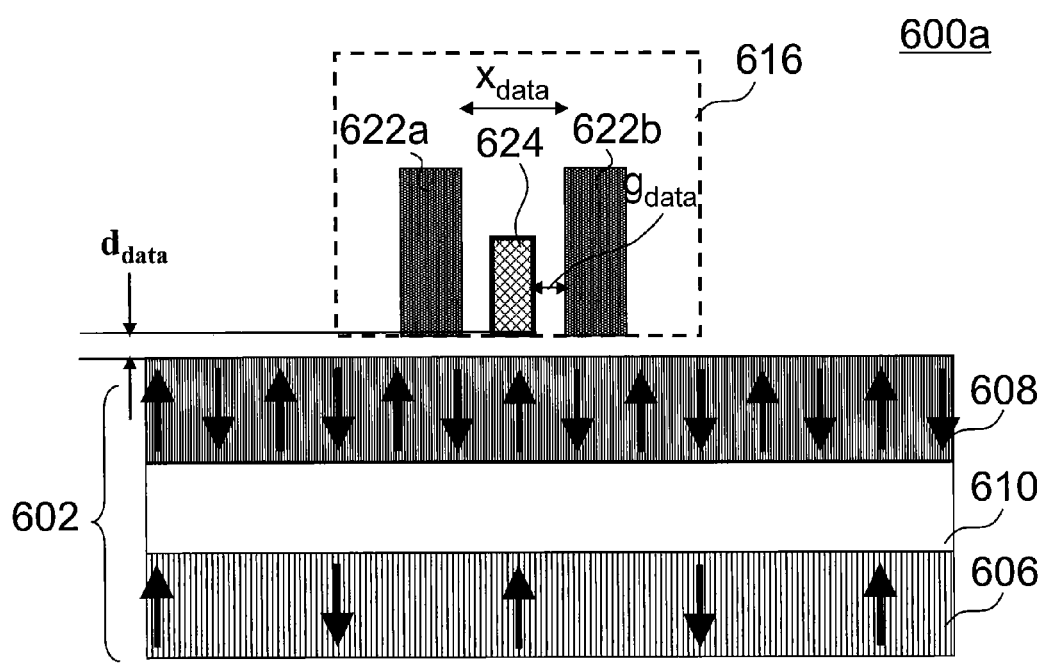
FIG. 6A is a cross-sectional side view of a data read head over a magnetic medium according to various embodiments.

FIG. 6A is a cross-sectional side view 600*a* of a data read head 616 over a magnetic medium 602 according to various embodiments. The magnetic medium may include a servo layer 606 and a data layer 608 over the servo layer. The magnetic medium may also include a spacer layer 610 between the servo layer 606 and the data layer. The magnetic medium may alternatively or additionally include one or more intermediate layers between the servo layer 606 and the data layer 608.

The data read head 616 may include a first shield structure 622*a*. The data read head 616 may also include a second shield structure 622*b*. The data read head 616 may further include a sensor 624 between the first shield structure 622*a* and the second shield structure 622*b*.

Figure 6B:
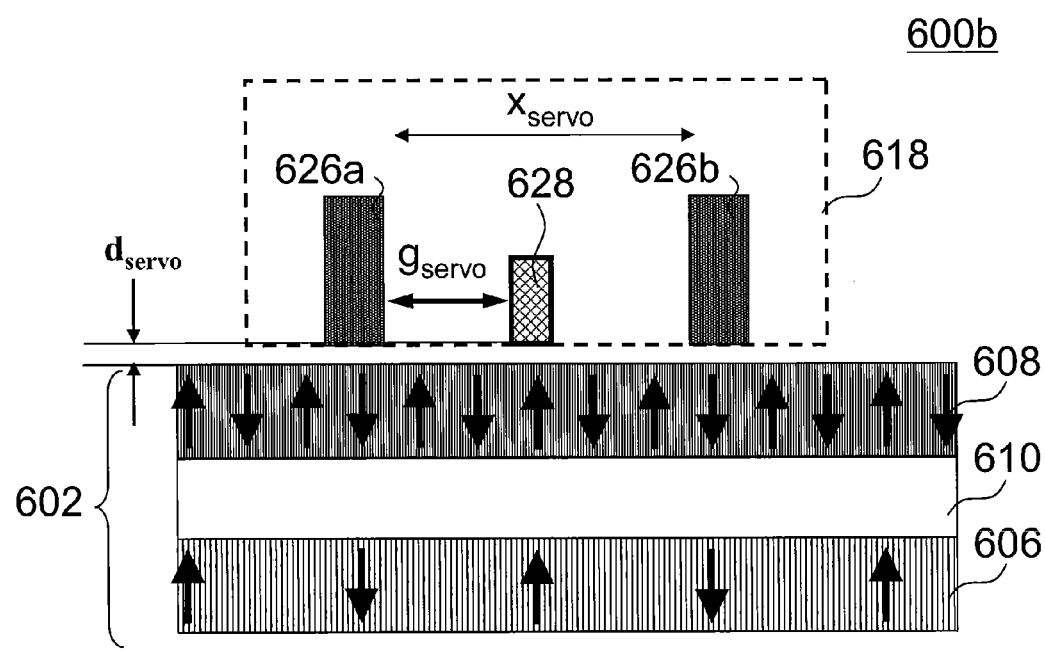
FIG. 6B is a cross-sectional side view of a servo read head over the magnetic medium according to various embodiments.

FIG. 6B is a cross-sectional side view 600*b* of a servo read head 618 over the magnetic medium 602 according to various embodiments. The servo read head 618 may include a third shield structure 626*a*. The servo read head 618 may also include a fourth shield structure 626*b*. The servo read head 618 may further include an other sensor 628 between the third shield structure 626*a* and the fourth shield structure 626*b*. A first distance (denoted by $x_{data}$) defined between the first shield structure 622*a* and the second shield structure 622*b* may be smaller than a second distance (denoted by $x_{servo}$) defined between the third shield structure 626*a* and the fourth shield structure 626*b*.

The data read head 616 may have a sensor-to-shield gap (denoted by $g_{data}$) that is smaller than a sensor-to-shield gap (denoted by $g_{servo}$) of the servo read head 618. The sensor-to-shield gap or distance may be proportional to the shield structure-shield structure distance.

The data read head 616 may have a width. The servo read head 618 may have a width. In various embodiments, the width of the servo read head 618 is different from the width of the data read head 616. In various embodiments, a width of the further servo read head may be different from the width of the data read head 616.

Figure 6C:
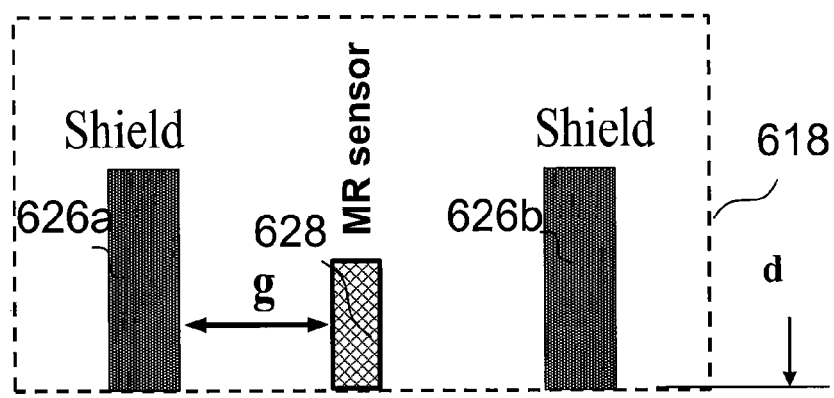
FIG. 6C is a cross-sectional side view of a servo read head over the magnetic medium according to various embodiments.
Figure 6C:
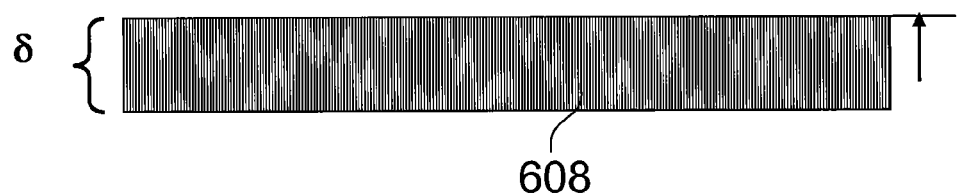

FIG. 6C is a cross-sectional side view 600*c* of a servo read head 618 over the magnetic medium according to various embodiments. The (servo) sensor-to-shield gap may be denoted by $g_{servo}$. The thickness of the data layer 608 is denoted by δ. The head-to-medium spacing, i.e. distance from the servo read head 618 to the medium may be denoted by $d_{servo}$.

In various embodiments, a spacing (head-to-medium spacing) between the servo read head 618 and the dual-layered medium (including the servo layer and the data layer), denoted as $d_{servo}$, is different from a spacing (head-to-medium spacing) between the data read head 616 and the dual-layered medium, denoted as $d_{data}$.

The readback signal ($V_{rms}$) from the dedicated servo head 618 may be expressed as:

$$V_{rms} \propto k_0 \exp(-k_0(a+d_{servo}))[(1-\exp(-k_0\delta))/(k_0\kappa)][\sin(k_{0Z}g_{servo}/2)/(k_0 g_{servo}/2)] \quad (1)$$

$$k_0 = \pi/B \quad (2)$$

wherein B is the bit length, a is a transition parameter.

Based on equations (1) and (2), significant gap loss may occur at $$g_{servo} = 2n\pi/k_0 \quad (3)$$

Figure 6D:
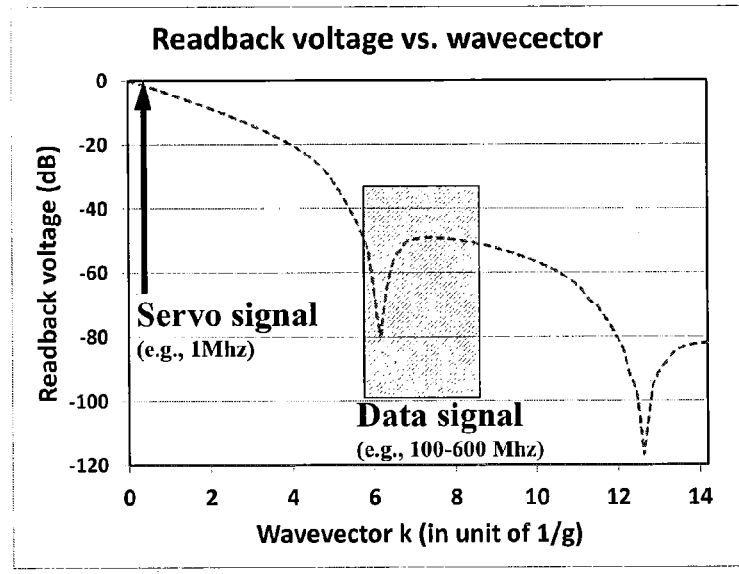
FIG. 6D is a plot of readback voltage as a function of wavevector (wave number).

FIG. 6D is a plot 600d of readback voltage as a function of wavevector (wave number). The optimized gap, g, in FIG. 6D, may refer to $g_{servo}$ for the servo read head and $g_{data}$ for the data read head. As shown in FIG. 6D, the use of the optimized gap (g) may further help reduce interference from the data signal due to the gap loss for higher frequency (wavevector or wave number k) data signal. High frequency (e.g., 100-600 Mhz) data signal may be 30 dB lower than low frequency (e.g., 1 Mhz) servo signal. Proper design of head-media-spacing for servo read head may further help reduce interference from data signal to servo signal.

In various embodiments, the servo read head 618 may be configured to read the servo layer by having a greater servo sensor (i.e. other sensor)-to-shield gap so that interference of data signals from the data layer are reduced or minimized. The data read head may be configured to read the data layer by having a smaller read sensor (i.e. sensor)-to-shield gap so that interference of servo signals from the servo layer are reduced or minimized.

In various embodiments, the servo read head 618 may be configured to read low frequency servo signals by having a greater distance between the third shield structure and the fourth shield structure while the high frequency data signals are reduced by the shield structures. The data read head 616 may be configured to read high frequency data signals by having a smaller distance between the first shield structure and the second shield structure while the low frequency servo signals are minimized by the shield structures.

Various embodiments may include configuring the servo read head (adjusting the servo sensor-to-shield distance or the distance between the third and fourth shield structures) so that interference of data signals to the servo sensor is reduced. Various embodiments may include further controlling head-medium spacing (d) of the servo read head 618 to further improve SNR.

Figure 7A:
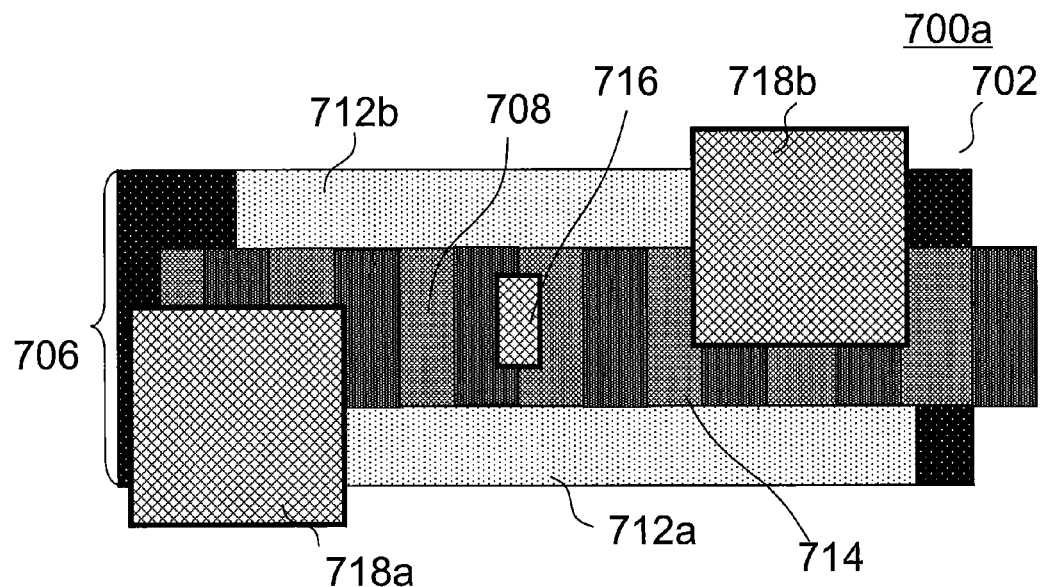
FIG. 7A is a top planar view of a data storage system according to various embodiments.

FIG. 7A is a top planar view 700a of a data storage system according to various embodiments. The data storage system may include a dual-layered medium 702 and a read assembly. The medium 702 may be similar to the medium 502 illustrated in FIGS. 5A-C. The medium 702 may include a servo layer 706 and a data layer 708 over the servo layer 706. The servo layer 706 may include a plurality of servo tracks such as servo track n (denoted by 712a) and servo track (n+1) (denoted by 712b). The servo layer 706 may include additional servo tracks which are not shown in FIG. 7A. Similarly, the data layer 708 may include a plurality of data tracks, such as data track 714. The data layer 708 may include additional data tracks which are not shown in FIG. 7A.

The magnetic medium 702 may be a ring-shaped disk having an inner circumference and an outer circumference substantially parallel to the inner circumference. The plurality of (servo and data) tracks e.g. 712a, 712b, 714 may run substantially parallel to the inner circumference and the outer circumference of the magnetic medium 702. The inner circumference may define an inner circumferential wall extending at least over a thickness of the servo layer 706 and a thickness of the data layer 708. The outer circumference may define an outer circumferential wall extending at least over the thickness of the servo layer 706 and the thickness of the data layer 708. The disk may have a first main surface and a second main surface limiting the thickness of the disk. The first main surface and the second main surface may be substantially parallel to each other and may be substantially perpendicular to the inner circumferential wall (or outer circumferential wall).

The plurality of tracks e.g. 712a, 712b, 714 may form a plurality of concentric rings on the recording medium. The plurality of concentric rings have a common centre coinciding with an axis of the disk running from the center of the first main surface of the disk to the second main surface of the disk.

Each track of the plurality of tracks may have a predetermined track width. In various embodiments, each data track (e.g. data track 714) may have the same track width. In various embodiments, each servo track (e.g. servo tracks 712a, 712b) may have the same track width. In various embodiments, the data tracks (e.g. data track 714) and the servo tracks (e.g. servo tracks 712a, 712b) may have the same track width.

In various embodiments, a data track may be arranged from a neighbouring servo track by half a track width or substantially half a track width. In other words, the data track may be arranged from the servo track (neighbouring to the data track) such that the projection of the data track on a plane parallel to the first main surface of the recording medium (or the second main surface of the recording medium) is half a track width or substantially half a track width from the projection of the servo track on the plane. For instance, data track 714 may be arranged from servo track 712a by half a track width and data track 714 may be arranged from servo track 712b by half a track width. In various embodiments, a data track may be arranged from a neighbouring servo track by a predetermined offset.

The read assembly may include a data read head 716 configured to read the data layer 708. The read assembly may also include a servo read head 718a configured to read the servo layer 706. The read assembly may further include a further servo read head 718b configured to read the servo layer 706.

As shown in FIG. 7A, the data read head 716 may be positioned or arranged between the servo read head 718a and the further servo read head 718b.

As shown in FIG. 7A, the data read head 716 may be configured to be positioned over the data track 714. The servo read head 718a may be configured to be positioned over a first servo track neighbouring to the data track 714, e.g. first neighbouring servo track 712a. The further servo read head 718b may be configured to be positioned over a second servo track neighboring to the data track 714, e.g. second neighbouring servo track 712b. In other words, as shown in FIG. 7A, the data read head 716, the servo read head 718a and the further servo read head 718b may not be aligned over the same track but may be configured to be arranged over different off-track positions. The data read head 716, the servo read head 718*a* and the further servo read head 718*b* may also have different down-track positions.

However, it may also envisioned in various alternate embodiments that the read head 716, the servo read head 718*a* and the further servo read head 718*b* may be configured to be arranged or positioned over the same track, e.g. data track 714. In other words, the read head 716, the servo read head 718*a* and the further servo read head 718*b* may be configured to be arranged over the same off-track position but different down-track positions. In various other embodiments, the data read head 716 may be arranged or positioned over a data track 714, while the servo read head 718*a* and the further servo read head 718*b* may be configured to be positioned or arranged over the same servo track neighbouring to the data track 714, e.g. servo track 712*a*.

Figure 7B:
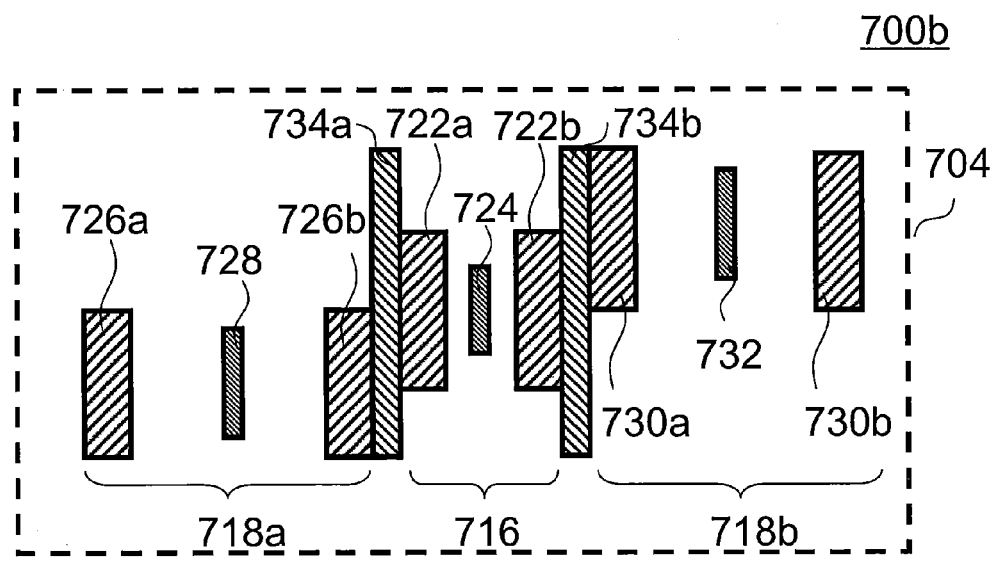
FIG. 7B is a schematic of the read assembly shown in FIG. 7A according to various embodiments.

FIG. 7B is a schematic 700*b* of the read assembly shown in FIG. 7A according to various embodiments. The read assembly may be denoted by 704 in FIG. 7B.

The data read head 716 may include a first shield structure 722*a*. The data read head 716 may also include a second shield structure 722*b*. The data read head 716 may further include a sensor 724 between the first shield structure 722*a* and the second shield structure 722*b*.

The servo read head 718*a* may include a third shield structure 726*a*. The servo read head 718 may also include a fourth shield structure 726*b*. The servo read head 718*a* may further include an other sensor 728 between the third shield structure 726*a* and the fourth shield structure 726*b*.

The further servo read head 718*b* may include a fifth shield structure 730*a*. The further servo read head 718*b* may also include a sixth shield structure 730*b*. The further servo read head 718*b* may further include a further sensor 732 between the fifth shield structure 730*a* and the sixth shield structure 730*b*.

A first distance defined between the first shield structure 722*a* and the second shield structure 722*b* may be smaller than a second distance defined between the third shield structure 726*a* and the fourth shield structure 726*b*. The first distance may also be smaller than a third distance defined between the fifth shield structure 730*a* and the sixth shield structure 730*b*. In other words, the distance between the shield structures of a servo read head may be greater than the distance between the shield structures of a data read head. The servo read heads 718*a*, 718*b* may have a larger read gap (or sensor-to-shield gap) than the data read head 716 and is thus more sensitive to low density servo signals. The read gap (or sensor-to-shield gap) may be proportional to the distance between the shielding structures on both sides of a sensor.

The second distance may be substantially equal to the third distance. In other words, the servo read head 718*a* and the further servo read head 718*b* may have the same read gap (or sensor-to-shield gap). The servo read head 718*a* and the further servo read head 718*b* may be substantially identical. The read assembly 704 may include an isolation layer 734*a* between the data read head 716 and the servo read head 718*a*. The read assembly 704 may also include a further isolation layer 734*b* between the data read head 716 and the further servo read head 718*b*. The isolation layer 734*a* and the further isolation layer 734*b* may include an electrically insulating material and may electrically insulate each read head from the neighbouring read head.

Figure 7C:
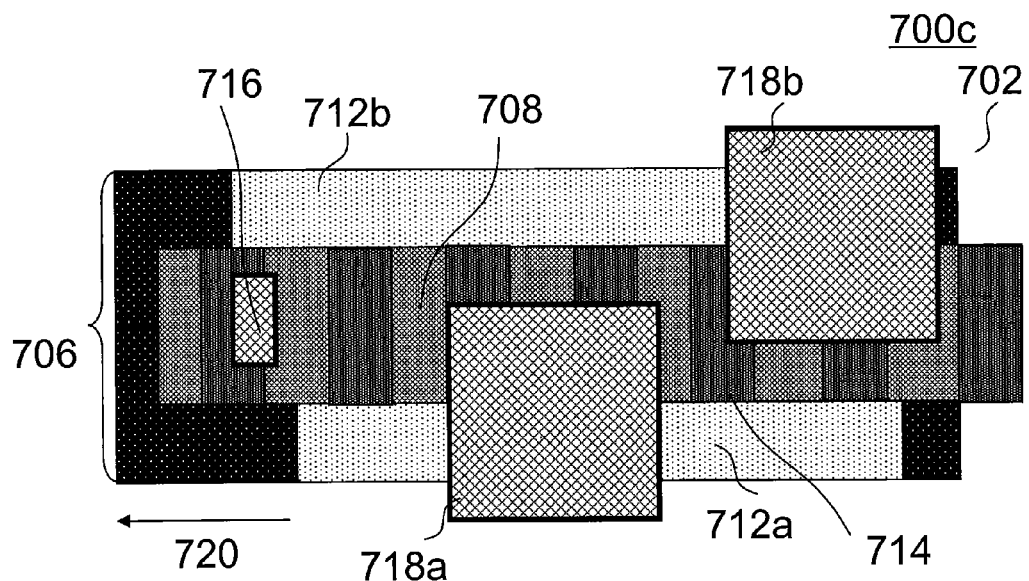
FIG. 7C is a top planar view of another data storage system according to various embodiments.

FIG. 7C is a top planar view 700*c* of another data storage system according to various embodiments. The data storage system may be similar to the data storage system shown in FIG. 7A but with the servo read head 718*a* positioned or arranged between the data read head 716 and the further servo read head 718*b*.

The read assembly may be configured to read the dual-layered medium 702 in a read direction. For instance, the read assembly may be configured to read the medium 702 in the direction indicated by arrow 720. The read assembly may be configured to read medium 702 when the medium 702 moves relative to the read assembly in a direction opposite the direction indicated by arrow 720.

In various embodiments, the servo read head 718*a* and further servo read head 718*b* may be positioned or arranged behind the data read head 716 in or along the read direction.

The data read head 716, the servo read head 718*a* and further servo read head 718*b* may be configured to be positioned or arranged over the same track or over different tracks. In other words, the data read head 716, the servo read head 718*a* and further servo read head 718*b* may be arranged over the same or over different off-track positions.

Figure 7D:
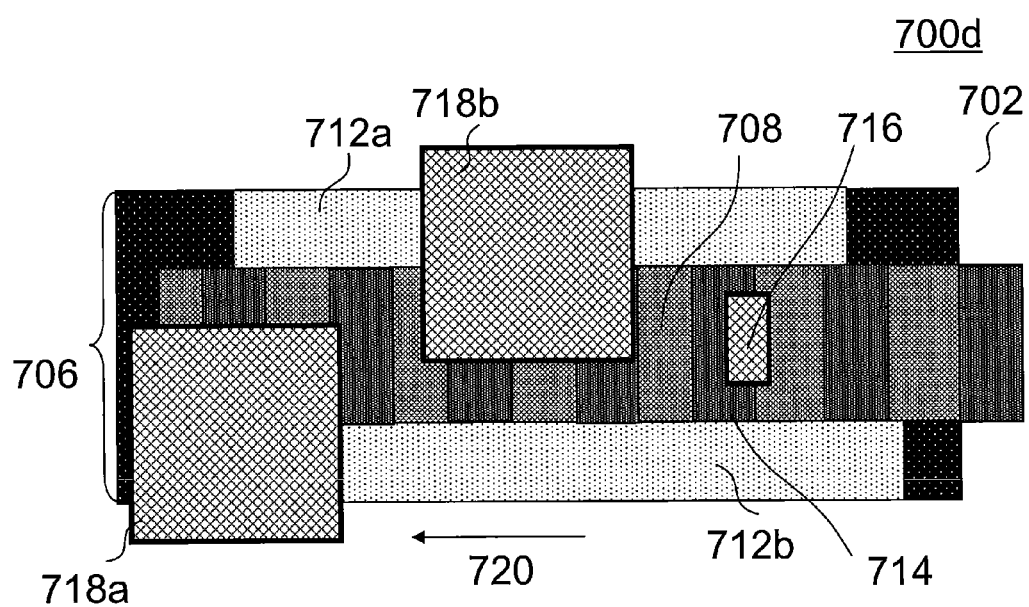
FIG. 7D is a top planar view of yet another data storage system according to various embodiments.

FIG. 7D is a top planar view 700*d* of yet another data storage system according to various embodiments. The data storage system may be similar to the data storage system shown in FIG. 7D but with the servo read head 718*a* and further servo read head 718*b* positioned or arranged in front of the data read head 716 in or along the read direction. The data read head 716, the servo read head 718*a* and further servo read head 718*b* may be configured to be positioned or arranged over the same track or over different tracks. In other words, the data read head 716, the servo read head 718*a* and further servo read head 718*b* may be arranged over the same or over different off-track positions.

Figure 7E:
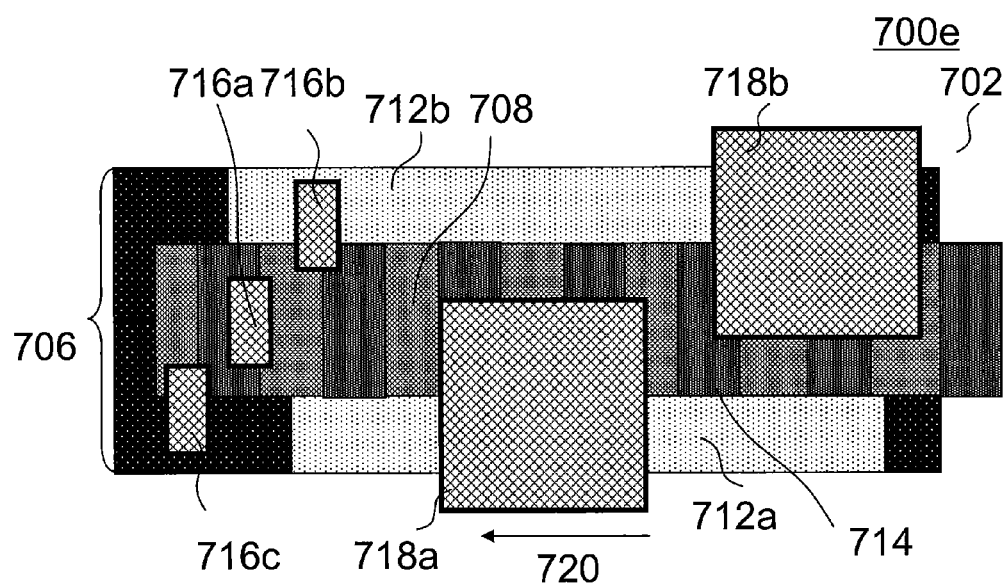
FIG. 7E is a top planar view of a further data storage system according to various embodiments.

FIG. 7E is a top planar view 700*e* of a further data storage system according to various embodiments. The data storage system may be similar to the data storage system shown in FIG. 7C but may include additional data read heads. The data storage systems may include one or more additional data read heads 716*b*, 716*c* further to data read head 716*a*. In other words, the data storage system may include a plurality of data read heads 716*a*. 716*b*, 716*c*. Various embodiments may include using a plurality of data read heads 716*a*, 716*b*, 716*c* for reading one track at a time. Various embodiments may involve two dimensional magnetic recording (TDMR). Various embodiments involving TDMR may help improve signal to noise ratio (SNR).

In various embodiments, the plurality of data read heads 716*a*, 716*b*, 716*c* may be arranged over different off-track and different down-track positions as shown in FIG. 7E. In various alternate embodiments, the plurality of data read heads 716*a*, 716*b*, 716*c* may be arranged over different off-track but same down-track positions. In various other embodiments, the plurality of data read heads 716*a*, 716*b*, 716*c* may be configured to be arranged or positioned over the same track at any time. In other words, the plurality of data read heads 716*a*, 716*b*, 716*c* may be arranged over same off-track but different down-track positions.

In various embodiments, the servo head 718*a* and further servo head 718*b* may be configured to be arranged or positioned over a different track as the data read heads 716*a*, 716*h*, 716*c*. The servo head 718*a* may be configured to be arranged or positioned over a first servo track 712*a* neighbouring the data track 714 and the further servo head 718*b* may be configured to be arranged or positioned over a second servo track 712*b* neighbouring the data track 714. In other words, the servo head 718*a* and the further servo head 718*b* may be arranged over different off-track positions in relation to any or all the plurality of data read heads 716*a*, 716b, 716c. In various other embodiments, the servo head 718a and further servo head 718b may be configured to be arranged or positioned over the same track as one or more of the plurality of data read heads 716a, 716b, 716c. In other words, the servo head 718a and the further servo head 718b may be arranged over the same off-track positions in relation to any of the plurality of data read heads 716a, 716b, 716c.

In various embodiments, the servo read head 718a and the further servo read head 718b may be arranged or positioned behind data read heads 716a, 716b, 716c in or along the read direction 720. The servo read head 718a may be between the further servo read head 718b and data read heads 716a, 716b, 716c. In various embodiments, the servo read head 718a and the further servo read head 718b may be arranged or positioned in front of data read heads 716a, 716b, 716c in or along the read direction 720. In various embodiments, the data read heads 716a, 716b, 716c may be arranged or positioned between the servo read head 718a and the further servo read head 718b.

The different embodiments described herein are intended as non-limiting examples. Any features of any embodiment may be combined with any feature of another embodiment.

FIG. 8 shows a schematic 800 illustrating a method using a read assembly to read a dual-layered medium. The dual-layered medium including a servo layer and a data layer over the servo layer. The method may include in 802, providing a read assembly over the dual-layered medium, the read assembly including a data read head and a servo read head. The method may include in 804, reading the data layer using the data read head and reading the servo layer using the servo read head.

In other words, the method may include positioning a read assembly over a dual-layered medium. The method may further include accessing the dual-layered medium using the read assembly. The data layer may be accessed using a data read head while the servo layer may be accessed using a servo read head. The read assembly may be any read assembly described herein. The dual-layered medium may be any medium described herein.

Methods described herein may further contain analogous features of any read assembly or data storage system. Correspondingly, a read assembly or data storage system described herein may further contain analogous features of any methods described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A read assembly for reading a dual-layered medium, the dual-layered medium comprising a servo layer and a data layer over the servo layer, the read assembly comprising:
a data read head configured to read the data layer; and
a servo read head, separate from the data read head, configured to read the servo layer,
wherein the read assembly is arranged over the data layer such that each of the data read head and the servo read head are arranged on a same side of the data layer opposite the servo layer.

2. A read assembly for reading a dual-layered medium, the dual-layered medium comprising a servo layer and a data layer over the servo layer, the read assembly comprising:
a data read head configured to read the data layer; and
a servo read head, separate from the data read head, configured to read the servo layer,
wherein the data read head comprises:
a first shield structure;
a second shield structure; and
a sensor between the first shield structure and the second shield structure.

3. The read assembly according to claim 2,
wherein the servo read head comprises
a third shield structure;
a fourth shield structure; and
another sensor between the third shield structure and the fourth shield structure;
wherein a first distance defined between the first shield structure and the second shield structure is smaller than a second distance defined between the third shield structure and the fourth shield structure.

4. The read assembly according to claim 1, further comprising:
an isolation layer between the data read head and the servo read head.

5. The read assembly according to claim 3,
wherein the sensor is a first magnetoresistance sensor; and
wherein the other sensor is a second magnetoresistance sensor.

6. The read assembly according to claim 1,
wherein the data read head and the servo read head are positioned over the dual-layered medium with the data layer closer to both the data read head and the servo read head than the servo layer.

7. A read assembly for reading a dual-layered medium, the dual-layered medium comprising a servo layer and a data layer over the servo layer, the read assembly comprising:
a data read head configured to read the data layer;
a servo read head, separate from the data read head, configured to read the servo layer; and
a further servo read head configured to read the servo layer.

8. The read assembly according to claim 7,
wherein the data read head is positioned between the servo read head and the further servo read head.

9. The read assembly according to claim 7,
wherein the servo read head is positioned between the data read head and the further servo read head.

10. The read assembly according to claim 1, further comprising:
one or more further data read heads.

11. A data storage system comprising:
a dual-layered medium; and
a read assembly according to claim 1;
wherein the read assembly is configured to read the dual-layered medium in a read direction.

12. The data storage system according to claim 11,
wherein the servo read head is positioned in front of the data read head in the read direction.

13. The data storage system according to claim 11,
wherein the servo read head is positioned behind the data read head in the read direction.

14. A data storage system comprising:
a dual-layered medium; and
a read assembly for reading a dual-layered medium, the dual-layered medium comprising a servo layer and a data layer over the servo layer, the read assembly comprising
a data read head configured to read the data layer, and
a servo read head, separate from the data read head, configured to read the servo layer,
wherein the read assembly is configured to read the dual-layered medium in a read direction;
wherein the dual-layered medium is a ring-shaped disk having an inner circumference and an outer circumference substantially parallel to the inner circumference;
wherein the inner circumference defines an inner circumferential wall extending at least over a thickness of the servo layer and a thickness of the data layer; and
wherein the outer circumference defines an outer circumferential wall extending at least over the thickness of the servo layer and the thickness of the data layer.

15. The data storage system according to claim 14,
wherein the dual-layered medium comprising a plurality of tracks substantially parallel to the inner circumference and the outer circumference.

16. The data storage system according to claim 15,
wherein the data read head and the servo read head are arranged so that a projection of the data read head on the medium and a projection of the servo read head on the medium are laterally along one track of the plurality of tracks at any time.

17. The data storage system according to claim 15,
wherein the plurality of tracks comprises:
a plurality of data tracks on the data layer; and
a plurality of servo tracks on the servo layer.

18. The data storage system according to claim 17,
wherein each track of the plurality of tracks has a predetermined track width; and
wherein a data track is arranged from a neighbouring servo track by half a track width.

19. The data storage system according to claim 17,
wherein each data track has a first predetermined track width;
wherein each servo track has a second predetermined track width; and
wherein the first predetermined track width is different from the second predetermined track width.

20. The data storage system according to claim 17,
wherein the data read head is configured to be positioned over the data track; and
wherein the servo read head is configured to be positioned over a neighbouring servo track.

21. The data storage system according to claim 20,
wherein a width of the servo read head is different from a width of the data read head.

22. The data storage system according to claim 20,
wherein a spacing between the servo read head and the dual-layered medium is different from a spacing between the data read head and the dual-layered medium.

23. A method of using a read assembly to read a dual-layered medium, the dual-layered medium comprising a servo layer and a data layer over the servo layer, the method comprising:
providing a read assembly over the dual-layered medium, the read assembly comprising a data read head and a servo read head separate from the data read head; and
reading the data layer from a first side of the data layer opposite the servo layer using the data read head and reading the servo layer from the same first side of the data layer opposite the servo layer using the servo read head.

* * * * *